July 18, 1950  W. J. DRUCKER  2,515,499
MANUALLY OPERATED COLLAPSIBLE CARROUSEL
Filed Jan. 9, 1947  3 Sheets-Sheet 1

William J. Drucker INVENTOR.

July 18, 1950     W. J. DRUCKER     2,515,499
MANUALLY OPERATED COLLAPSIBLE CARROUSEL
Filed Jan. 9, 1947     3 Sheets-Sheet 2
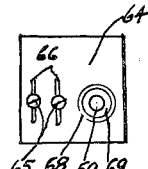
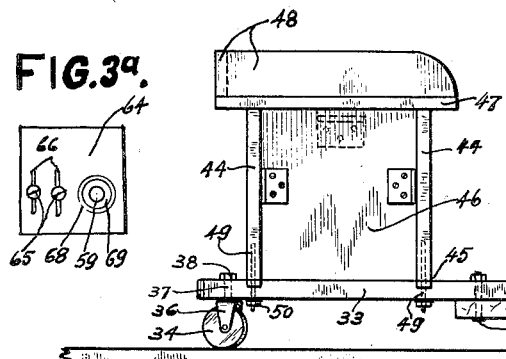
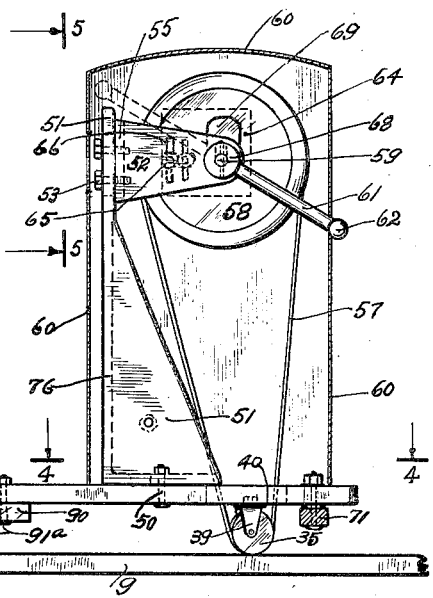
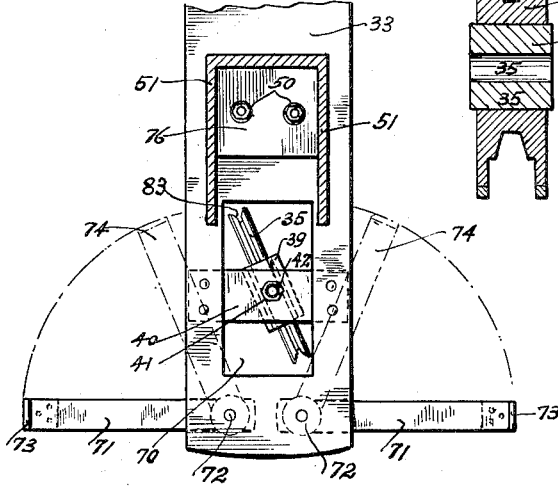
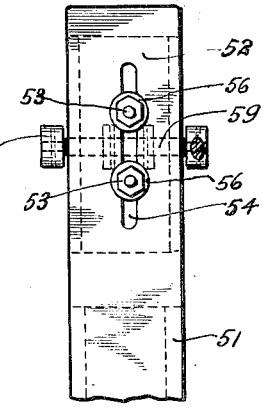
INVENTOR.

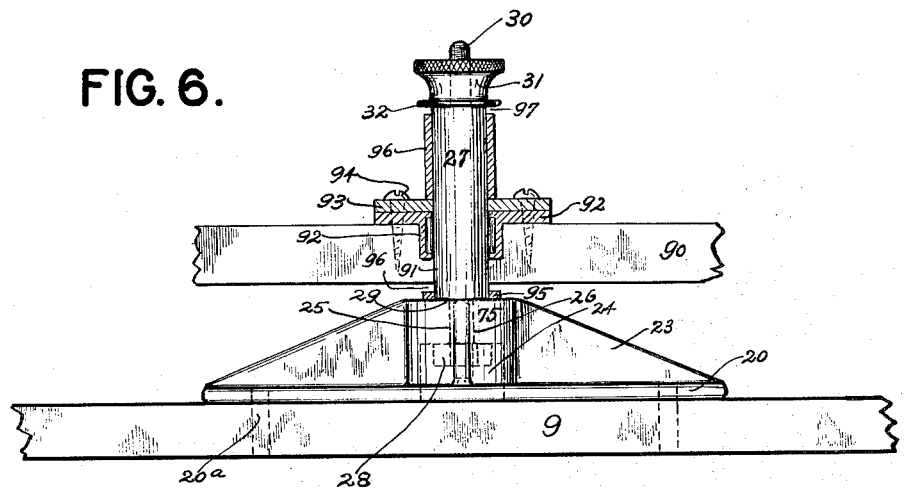

Patented July 18, 1950

2,515,499

UNITED STATES PATENT OFFICE 2,515,499

MANUALLY OPERATED COLLAPSIBLE CARROUSEL

William J. Drucker, Richmond Hill, N. Y.

Application January 9, 1947, Serial No. 721,009

2 Claims. (Cl. 272—33)

This invention relates to amusement devices of the carrousel type, which I designate a whirlmobile. Improvements are made with a view to greater simplicity and ease of operation of this manual amusement device, with better safety features.

A further object of this device is to make the same easier assembled, and likewise to create a collapsible make, to readily pack and store the same out of the way after use.

In accordance with the present invention I provide a two carriage, respectively two person unit. Each carriage has a propelling mechanism, although a propelling arrangement in only one carriage will suffice, especially in models for the smaller children. In that case the carriage without the propelling means comprises primarily the base with the wheels, the seat, and the foot rests.

A typical and illustrative whirlmobile, embodying the present invention will now be described in some detail, reference for this purpose being had to the accompanying drawings, in which:

Fig. 3 is a side elevation of a carriage, part of the guard removed.

Fig. 3a is a hub slot cover plate.

Fig. 4 is a section taken on the line 4—4 in Fig. 3.

Fig. 4a is a traction pulley wheel in cross section.

Fig. 5 is an elevation taken on the line 5—5 in Fig. 3, the guard cover removed.

Fig. 6 is an elevation, partly in cross section, of the assembled axle socket plate and axle stud.

Figure 1:
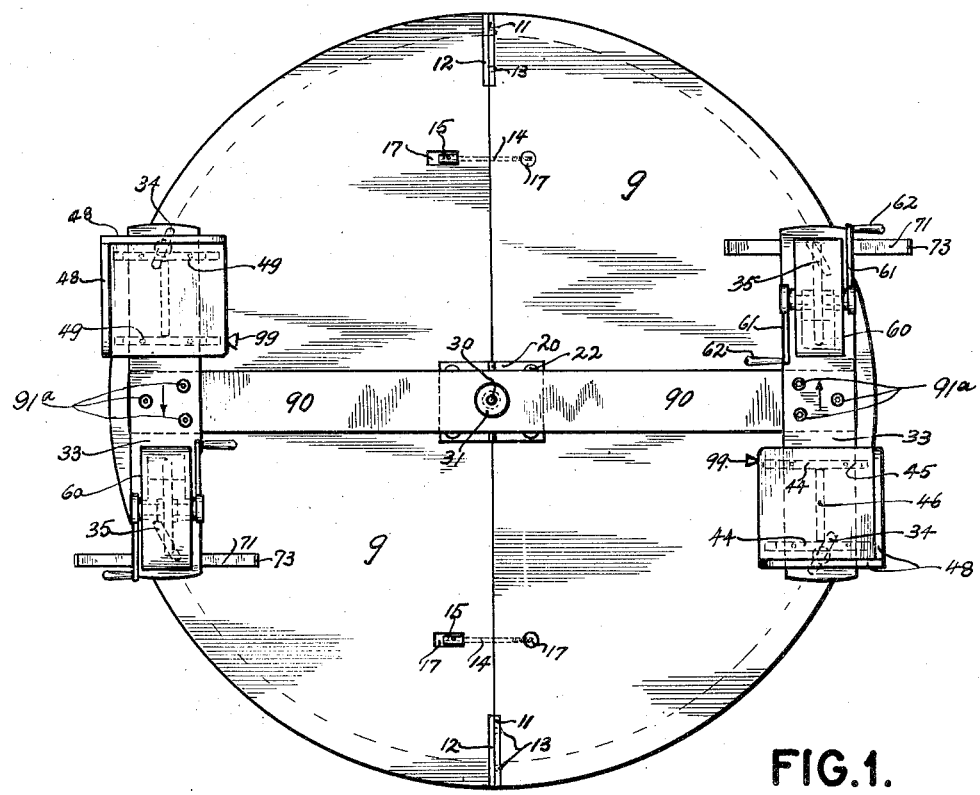
Fig. 1 is a plan view of the assembled invention.

Fig. 7 embodies a sectional illustration of the application of the runway sections locking means.

Fig. 8 is an assembly of the drive shaft and pulley.

Fig. 9 is a seat shown in a collapsed state.

The runway base 9 is made collapsible in two sections, each is semicircular in shape and of appropriate thickness. Lock plates 11 are stationarily attached to the sides, preferably at the end portions of the straight sides of one, to one section, and lock plates 12 to the other section, to be aligned with one another by means of holes and pins to each set of plates, pins 13 closely fitting opposite holes. This arrangement serves to secure an even alignment of the runway surface. To assure rigidity of the assembled sections, locking means, tightly drawing the two sections together, is provided in a suitable location, as indicated in Fig. 7. Preferably two units of such locking means are applied. An elongated screw 14 is inserted through a corresponding hole, partly extended into each section, through the runway base. The head 15 of each screw 14 preferably is made as a separate unit. An open space 17 of sufficient size permits to insert the shank of the screw 14 into one of the sections. After the screw 14 has been inserted, the screw head 15 is attached thereto in any suitable manner. The open space 17 is deep enough to permit the screw shank 14 to recede flush with the sectional diametrical side at the screw thread end, when the sections are not assembled. A washer 16 is also provided. A nut 74 with thread for insertion of screw 14 is stationarily inserted through the runway base in that section opposite the one holding the screw and nut 14, 15. Having assembled the runway sections, under application of the lockplates 11, 12, screw 14 can now be inserted into nut 74, and the two sections drawn tight, so that a rigid assembly is effected in this manner. Holes 18 serve, by means of a pin, to turn the screw head 15. A ready collapsing of this unit by means of unscrewing these aligning and locking means is readily accomplished.

Underneath the base 9, adjacent to the periphery and also near the center portion of the same a plurality of rubber feet 19 are provided to serve as noise and shock absorbing means, also for the protection of floors, rugs, etc.

Upon the runway base 9, centrally located, an axle socket plate 20 is mounted, held in place by threaded studs 21, reaching through holes 20a in said plate and base 9, and having knurled thumbnuts 22. Plate 20 has re-enforcing rib sections 23, a raised hub 75, and a hollow hub portion 24 for the placing of a nut. A vertical socket hole 25 is provided through the center of said hub top, as at 24, to receive the threaded stud portion 26 of a stud axle 27 which is secured to socket plate 20 by a nut 28 in co-operation with stud axle shoulder 29. At its upper exposed end axle 27 is provided with a threaded stud portion 30 to receive a knurled thumb nut 31, having a shoulder 32.

The carriage assembly includes a carriage base 33, with one supporting wheel 34 at one end, and another supporting wheel 35 at the other end. Wheel 34 includes a fork 36, a stem 37, and a nut 38. Wheel 35 includes a fork 39, a fork base plate 40, a stem 41 with nut 42. Both supporting wheels 34 and 35 include the conventional axle and nuts. The carriage is provided with a collapsible seat structure, including two vertically hinged walls 44, mounted across the base 33, notched, as at 45, and a seat centerboard 46, to which is hinged the horizontal seat portion 47, with upright supports 48. Hanger bolts 49 serve with nuts 50 to hold the seats bolted to the base 33, and permit collapsing of the same, as indicated in Fig. 9, thereby requiring less space for packing or storing of the seats after they have been collapsed.

The manual propelling mechanism for this carriage includes a base bracket post 76, secured to base 33 as at 50. This post has re-enforcing walls 51. A pulley bracket 52 is adjustably mounted upon base bracket 76 at its upper end. Machine bolts 53 are inserted through a slot 54 into a pulley bracket plate 55, and are threaded in said plate. This arrangement includes washers 56, and by unscrewing bolts 53 permits an adjustment of pulley bracket 52 upwardly or downwardly for the purpose of loosening or tightening a V-shaped belt 57. The belt 57 passes round the pulley 58 and the wheel 35. In the pulley bracket 52 there is rotatable a shaft 59, each end portion of which protrudes beyond a guard cover 60. To each end of the shaft 59 there is affixed a crank 61, with handle 62. Fig. 8 indicates pins 63, tightly fitting through holes in crankhub 68, pulley hubs 69, and through the shaft 59, for a solid mounting of these parts upon said shaft.

Figure 2:
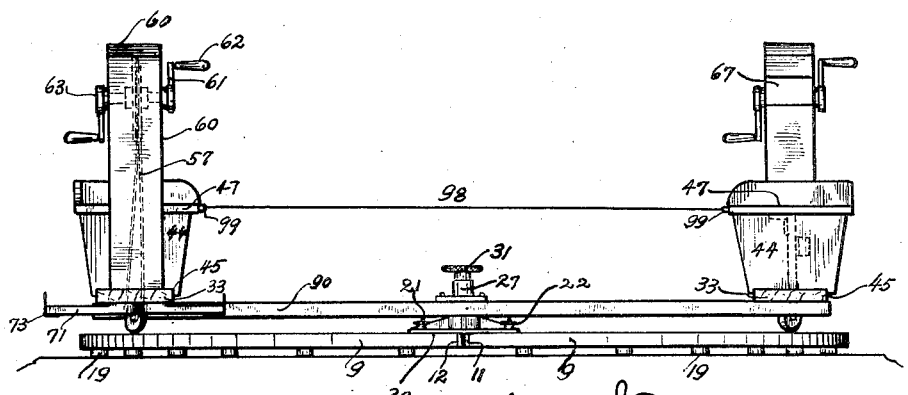
Fig. 2 is an elevation of the assembled invention.

The guard cover 60 is provided with a slotted portion 69. This slot allows the shaft assembly, Fig. 8, to be moved upwardly for belt adjustment, without interference with the guard 60, which remains in place, fastened to base board 33. Another feature, facilitating belt adjustment in this manner is a guard opening 67, Fig. 2, which permits access to bolts 53, when guard cover is in place. To eliminate any danger to the carriage operator from said slot opening 67, a plate cover 64, Fig. 3a, is applied over this section on both sides of the guard. The plate 64 has a hole 68, clearing hub 69, in which is journaled shaft 59. Plate 64 has two slots 66. Screws 65 reach through said slots, and through corresponding slots in guard 60 (not shown) into a threaded portion of the adjacent pulley bracket 52, thereby holding plates 64 adjustably in position in relation to the moving pulley bracket 52 with belt adjustment. The plate, Fig. 3a, is arranged as to slots 66 and hole 69 for the front portion of guard 60 (not shown in Fig. 3). The plate 64, for the opposite side, is to be arranged as to slots 66 and hole 69 in an opposite manner, as indicated in dotted lines, Fig. 3.

In Fig. 4 an opening 70 for belt clearance in carriage base 33 is shown. This forward portion of base 33 is also provided with two foot rests 71, one rest on each side of the base. The rests are hinged under base 33, as at 72, hinging horizontally forward, and laterally to a maximum degree of 90 in relation to the sides of the base. The outer ends of said rests are provided with a foot stop 73 to prevent the foot from sliding off. The foot rests 71 are held firmly in position at right angle to the base 33 by the forward tendency of the foot of the operator. Said rests can be folded back, as indicated at 74 for ease in collapsing and packing.

Fig. 4a shows traction pulley wheel 35, especially constructed to serve as traction wheel and pulley at the same time. This wheel, preferably made of a rubber composition, consists of a conventional bearing portion 80 and a core portion 81, which is provided with an annular stepped groove consisting of a V-belt groove section 83 and a belt clearance groove section 84. The groove sections 83 and 84 are situated with their centre portions equidistant to a line drawn from centre to centre of the tread through the wheel, groove section 84 emanating through a resilient tread portion 82 outwardly to the tread, is, preferably, a straight wall groove. The depth of the belt clearance groove is determined by the adopted pulley wheel diameter in relation to the pulley groove pitch diameter chosen. In order to be able to mount the V-belt 57 in a central location of base 33 this traction wheel pulley has been adopted. This construction provides for a symmetrical and equidistant distribution of all wheel supporting parts in relation to the longitudinal axis of carriage base 33. The width of groove 84 is determined by the necessary belt clearance of pulley wheel 35 as to its angular position in relation to pulley 58 and the resulting belt twist over these two pulleys. Pulley 58 is mounted in line with the longitudinal axis of base 33. The carriage wheels are to be set at certain equal angles at each end of carriage base 33, but said angles in opposition to one another, conforming to the attainment of the perimetrical circle of the runway direction.

A horizontal seatbrace 90 is provided, connecting the two carriage units by means of bolts, washers and nuts, preferably thumbnuts, or by any other suitable and quick detachable means, as at 91. Brace 90 holds the carriages in equal radial spacing, also securing a substantially vertical position of the carriage in relation to carriage base 33. The level of seat 47 might be slightly inclined towards the axle stud center of axle 27. In its center portion brace 90 is provided with a bearing 92, with bearing cover 93, stationarily mounted by screws 94. Fig. 6 shows stud axle 27 assembled in bearing 92. A washer 95, with clearance as at 96, is provided to support brace 90. Also a washer 96 is placed around axle 27 above bearing 92, providing a clearance as at 97. Thus after nut 31 is in place, brace 90 is held in a controlled vertical position, in addition to the lateral control of said brace. A strap 98 connecting two opposite carriages, with fastening means 99, is furthermore provided to hold the carriage assembly in position against an occasional excessive, outwardly directed, centrifugal force.

Having thus described the constructive details of this device, the function of same is as follows: This carrousel is designed for two persons, although, because of the weight of, and the firmly placing of the runway base, one person may ride the same. The riders, after taking seats, place the feet upon the footrests 71, and start to rotate the crankhandles 62. The carriage driving mechanism is then set in motion, and the traction pulley wheels 35 revolving, pull the carriages along. In case of an application to a driving carriage mechanism in only one of the carriages, the brace 90 will transfer part of the driving force to the carriage without the driving means, also due to the rather frictionless journal arrangement of axle and bearing centrally mounted in the brace.

It is obvious, that one or a plurality of carriages, or seat and drive arrangements may be chosen for one whirlmobile, according to the disclosure of these improvements, especially with the adoption of larger diameters of the runway base.

The runway base could also be made in two or more sections, according to the detailed improvements as to aligning and lock joint means to insure a level rigid surface.

The present invention thus provides the novel combination of improved units for amusement devices of the carrousel type, as disclosed in considerable detail. It is to be understood, however, that this is for illustrative purposes only, and that various changes in design, structure and arrangement may be made without departing from the spirit and scope of the invention or of the appended claims.

I claim:

1. In a collapsible carrousel, the combination of a base which is foldable along a straight line running through its center and provided with locking means for stiffening the base when it is unfolded, with an I-shaped member the center of whose web section is rotatably and detachably secured to the center of the unfolded base and whose flange sections have rollers at the lower side of their extremities adapted for supporting them upon said base, and a bracket secured to the upper side of an end portion of each of said flange sections and being provided with vertically adjustable bearing means carrying a crankshaft to which is secured a pulley, the latter being connected to one of said rollers by means of a belt extending through an aperture in the flange section, each of the rollers which is engaged by a belt having an annular groove which is of such a depth that the outer rim section of the grooved roller portion protrudes beyond the belt, and said bracket with said pulley and belt being encompassed in a casing which is provided with vertical slots through which are extended the end portions of said crankshaft, said portions being provided with crank handles.

2. The combination, in a collapsible carrousel which comprises arms radiating from a journal and having T-shaped extremities upon which collapsible seats are mounted and which are supported by rollers secured to the lower side of said T-shaped extremities, of a base to which said journal is detachably secured and sections of which are hinged to one another and are foldable one upon the other and provided with locking means for stiffening the base sections relative to each other when the base is unfolded, with an upright bracket being secured to the upper side of an end portion of each T-shaped extremity of said arms and having vertically adjustably secured to it a member which carries rotatably a shaft to which is secured a pulley, and a casing encompassing said bracket as well as said member, said casing being secured to one end portion of said T-shaped extremity and being provided with vertical slots through which extend the end portions of said crank shaft, said end portions being provided with crank handles, said pulley within said casing being connected to one of said rollers by means of a belt extending through an aperture in the flange section, each of the rollers which is engaged by said belt having an annular groove which is of such a depth that the outer rim section of the grooved roller protrudes beyond that belt portion which passes around the thus grooved roller.

WILLIAM J. DRUCKER.

REFERENCES CITED

The following references are of record in the file of this patent:

UNITED STATES PATENTS

| Number | Name | Date |
| --- | --- | --- |
| 1,529,512 | Smerechanski | Mar. 10, 1925 |

FOREIGN PATENTS

| Number | Country | Date |
| --- | --- | --- |
| 29,794 | Norway | Sept. 22, 1924 |